US008584094B2

(12) United States Patent
Dadhia et al.

(10) Patent No.: US 8,584,094 B2
(45) Date of Patent: Nov. 12, 2013

(54) DYNAMICALLY COMPUTING REPUTATION SCORES FOR OBJECTS

(75) Inventors: Rajesh K Dadhia, Redmond, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1167 days.

(21) Appl. No.: 11/771,594

(22) Filed: Jun. 29, 2007

(65) Prior Publication Data

US 2009/0007102 A1 Jan. 1, 2009

(51) Int. Cl.
*G06F 9/44* (2006.01)
*G06F 9/455* (2006.01)
*G06F 12/14* (2006.01)

(52) U.S. Cl.
USPC ........... 717/127; 717/126; 717/131; 717/135; 718/1; 726/22; 726/24

(58) Field of Classification Search
None
See application file for complete search history.

(56) References Cited

U.S. PATENT DOCUMENTS

| | | | |
|---|---|---|---|
| 6,065,118 A * | 5/2000 | Bull et al. ........................ 726/22 |
| 6,192,512 B1 * | 2/2001 | Chess ............................ 717/127 |
| 6,856,963 B1 | 2/2005 | Hurwitz |
| 7,093,239 B1 * | 8/2006 | van der Made ................ 717/135 |
| 7,409,719 B2 * | 8/2008 | Armstrong et al. ............. 726/24 |
| 7,747,987 B1 * | 6/2010 | Akarte et al. .................. 717/131 |
| 7,996,836 B1 * | 8/2011 | McCorkendale et al. ........ 718/1 |
| 2004/0122926 A1 | 6/2004 | Moore et al. |
| 2005/0268338 A1 * | 12/2005 | Made ............................... 726/24 |
| 2006/0009994 A1 | 1/2006 | Hogg et al. |
| 2006/0026123 A1 | 2/2006 | Moore et al. |
| 2006/0059469 A1 * | 3/2006 | Schumacher .................. 717/127 |
| 2006/0095586 A1 | 5/2006 | Adelman et al. |
| 2006/0136720 A1 * | 6/2006 | Armstrong et al. ........... 713/164 |
| 2006/0212930 A1 * | 9/2006 | Shull et al. ....................... 726/10 |
| 2006/0230452 A1 * | 10/2006 | Field ................................ 726/22 |
| 2006/0253581 A1 | 11/2006 | Dixon et al. |
| 2006/0253841 A1 * | 11/2006 | Rioux ........................... 717/127 |
| 2006/0272002 A1 | 11/2006 | Wightman et al. |
| 2007/0027992 A1 | 2/2007 | Judge et al. |
| 2007/0180429 A1 * | 8/2007 | Gogh et al. .................... 717/126 |
| 2007/0220607 A1 * | 9/2007 | Sprosts et al. .................. 726/24 |
| 2008/0133540 A1 * | 6/2008 | Hubbard et al. ................ 707/10 |
| 2009/0282476 A1 * | 11/2009 | Nachenberg et al. ........... 726/22 |
| 2009/0288161 A1 * | 11/2009 | Wei et al. ......................... 726/22 |

OTHER PUBLICATIONS

Norman SandBox Whitepaper, Norman, 2003, 19 pages, [retrieved on Jun. 28, 2013], Retrieved from the Internet: <URL: download.norman.no/whitepapers/whitepaper_Norman_SandBox.pdf>.*
Lam, L., et al., Secure Mobile Code Execution Service, Proceedings of the 20th conference on Large Installation System Administration, 2006, 9 pages, [retrieved on Jun. 28, 2013], Retrieved from the Internet: <URL:www.ecsl.cs.sunysb.edu/tr/TR196.pdf>.*

(Continued)

*Primary Examiner* — Thuy Dao
*Assistant Examiner* — Geoffrey St Leger
(74) *Attorney, Agent, or Firm* — Lee & Hayes, PLLC (57) ABSTRACT

Tools and techniques for dynamically computing reputation scores for objects are described herein. The tools may provide machine-readable storage media containing machine-readable instructions for receiving requests to dynamically compute reputation scores for the objects, for instantiating protected virtual environments in which to execute the objects, and for computing the reputation score based on how the object behaves when executing within the virtual environment.

20 Claims, 5 Drawing Sheets

(56) References Cited

OTHER PUBLICATIONS

Liang, et al., "PET: A Personalized Trust Model with Reputation and Risk Evaluation for P2P Resource Sharing", available at least as early as Feb 9, 2007, at <<http://www.cs.wayne.edu/~weisong/papers/liang05-pet.pdf>>, pp. 1-10.

Maximilien, et al., "Conceptual Model of Web Service Reputation", available at least as early as Feb. 9, 2007, at <<http://www.sigmod.org/sigmod/record/issues/0212/SPECIAL/6.Maximilien-Singh.pdf>, ACM, 2002, pp. 1-6.

Maximilien, et al., "Reputation and Endorsement for Web Services", available at least as early as Feb . 9, 2007, at <<http://www.csc.ncsu.edu/faculty/mpsingh/papers/mas/sigecom-02.pdf>>, pp. 1-8.

Maximilien, et al., "Toward Autonomic Web Services Trust and Selection", available at least as early as Feb. 9, 2007, at <<http://www.csc.ncsu.edu/faculty/mpsingh/papers/mas/icsoc-04-maximilien-singh.pdf>>, ACM, 2004, pp. 1-10.

* cited by examiner

DYNAMICALLY COMPUTING REPUTATION SCORES FOR OBJECTS

BACKGROUND

Wide area communication networks, such as the Internet, are enabling more users to interact with more objects remotely. Examples of such objects may include files, websites, applications, installers, or the like.

With these increased opportunities for interaction come increased risks. Some objects may be known, in the sense that the risk of interacting with them is known and relatively limited. However, other objects may be unfamiliar, and the risk of interacting with them may thus be unknown. Some unknown objects may be malicious, in the sense that they may contain some form of malware, spyware, malicious code, or the like. If users nevertheless proceed to interact with these unknown objects, the users' devices may suffer harmful side effects from malicious objects.

Whitelisting and blacklisting services have become available, as part of ongoing efforts to combat the above issues. These services may be continually updated based on comments from communities of users, based on in-house testing, or the like. However, new (possibly malicious) objects are introduced almost constantly between the first time that a new object is introduced and the time that it is cleared or blocked by a whitelisting/blacklisting service, the object is, in some sense, unknown, and users may be vulnerable to these unknown objects.

SUMMARY

Tools and techniques for dynamically computing reputation scores for objects are described herein. The tools may provide machine-readable storage media containing machine-readable instructions for receiving requests to dynamically compute reputation scores for the objects, for instantiating protected virtual environments in which to execute the objects, and for computing the reputation score based on how the object behaves when executing within the virtual environment.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to dynamically computing reputation scores for objects are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools dynamically compute reputation scores for objects. This discussion also describes other techniques and/or processes that the tools may perform.

Figure 1:
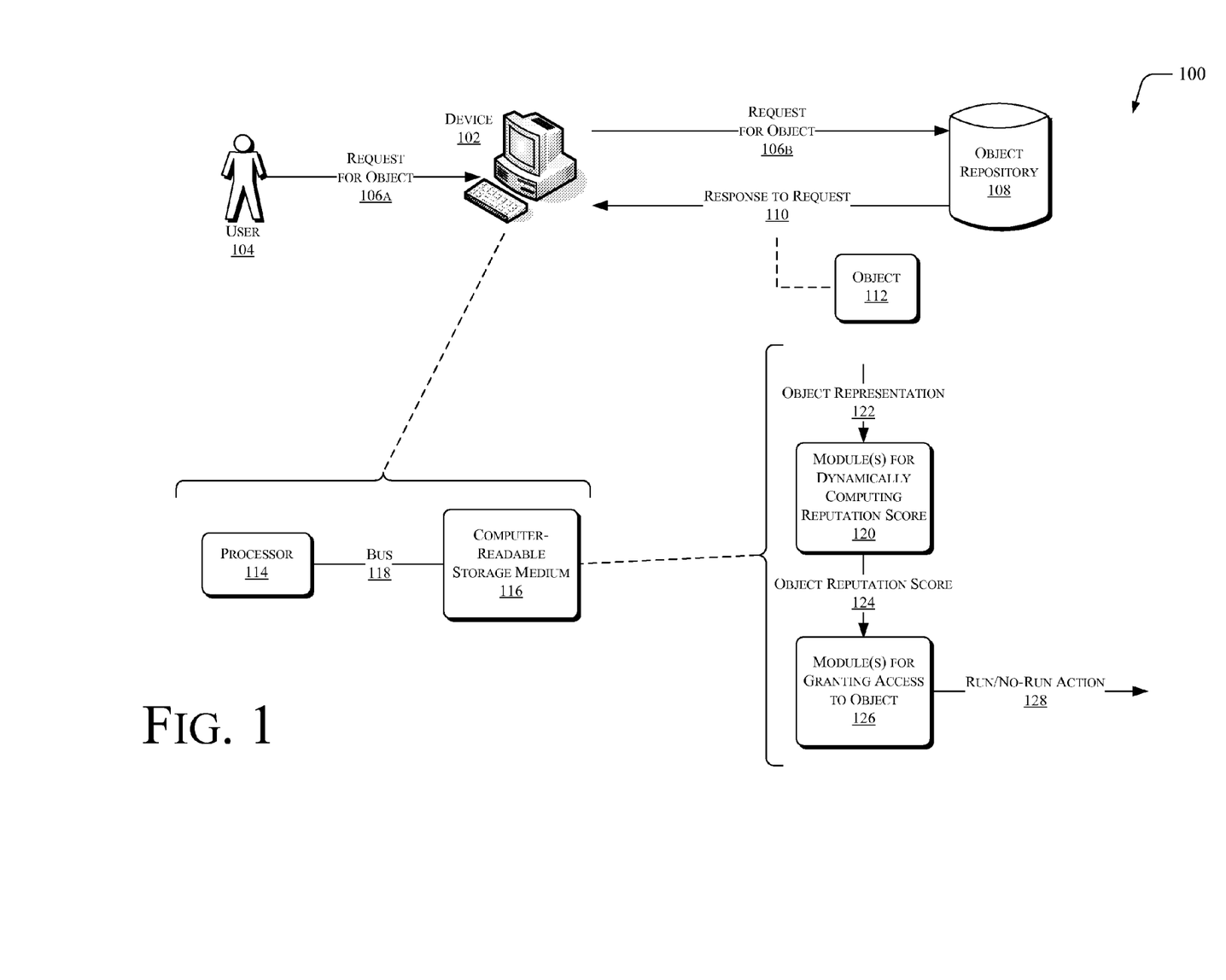
FIG. 1 is a block diagram illustrating systems and/or operating environments in which tools and techniques for dynamically computing reputation scores for objects may perform.

FIG. 1 illustrates systems and/or operating environments 100 in which tools and techniques for dynamically computing reputation scores for objects may perform. The systems 100 may include one or more devices 102. However, it is noted that this description provides this example device only to facilitate discussion of the subject matter herein, but not to limit possible implementations of this subject matter. Devices other than those shown in FIG. 1 may benefit from dynamically computing reputation scores for objects, as described herein. For example, the devices 102 may take the form of personal computers (PCs), mobile laptop or notebook devices, cellular telephones, personal digital assistants (PDAs), communications devices, or the like.

The device 102 may receive one or more requests to access objects from one or more users 104. FIG. 1 denotes an example of such an object request at 106a, as submitted by the user, and at 106b as directed to a repository 108 that contains the objects.

The requested objects 106 may include, for example only, one or more file to be downloaded to and/or executed on the device. These files may include image data (e.g., .jpeg or .gif files, or the like), audio and/or video files, applications or installers for applications, executable or binary files, or the like. In these examples, the repository 108 may represent one or more servers storing or hosting these files. Additionally, the objects may include web pages hosted on a website, with the website providing an example of the object repository 108.

FIG. 1 denotes a response to the requests 106 at 110, with the requested object denoted at 112. However, in some instances, the object may be at least somewhat unknown, and if loaded immediately into the device 102 and accessed or executed, might cause detrimental side effects to the device 102. To assess the risk of the object 112 causing this scenario, the device 102, and/or other devices or services, may dynamically compute a reputation score for the object, as now described in more detail.

Turning to the device in more detail, the device may be a computer-based system that includes one or more processors, denoted at 114. These processors may also be categorized or characterized as having a given type or architecture, but in implementations that include more than one processor, these processors may or may not have the same type or architecture.

The device may also include one or more instances of machine-readable or computer-readable storage media, denoted generally at 116. The processor may communicate with the computer-readable media, and other components or sub-systems of the devices, via one or more busses 118. These busses 118 may be of any suitable width, and may comply with any convenient bus architecture.

The computer-readable media 116 may contain instructions that, when executed by the processor 114, perform any of the tools or related functions that are described herein as being performed by the workstations and/or servers. The processor may access and/or execute the instructions embedded or encoded onto the computer-readable media, and/or may access data stored in the computer-readable media. Additionally, it is noted that the computer-readable storage media, and any software stored thereon, may reside on hardware other than that shown in FIG. 1 without departing from the scope and spirit of the description herein. The examples shown in FIG. 1 are provided only to facilitate discussion, but not to limit possible implementations.

Turning in more detail to the computer-readable media 116, it may include one or more modules of software instructions for dynamically computing reputation scores for objects, denoted generally at 120. As shown in FIG. 1, such modules 120 may receive an indication or representation of the requested object, as denoted at 122, and may compute a reputation score for the requested object, as denoted at 124.

The computer-readable media 116 may also include one or more modules 126 for receiving the reputation score 124, and determining whether to grant access to the requested object 124. Depending on how the reputation score compares to some threshold, the module 126 may issue a run/no-run action, denoted generally at 128. Generally, if the reputation score, as compared to the threshold, indicates that the object poses an acceptable amount of risk to the device 102, then the run/no-run action 128 may allow the user to access the object 112. Otherwise, if the reputation score indicates that loading and accessing the object using the device may impose undue risk to the device, then the run/no-run action 128 may advise the user against accessing the object 112. The threshold for the reputation score may be set by the user 104, by a system administrator in charge of the device, by an automated process, or by other suitable techniques.

Figure 2:
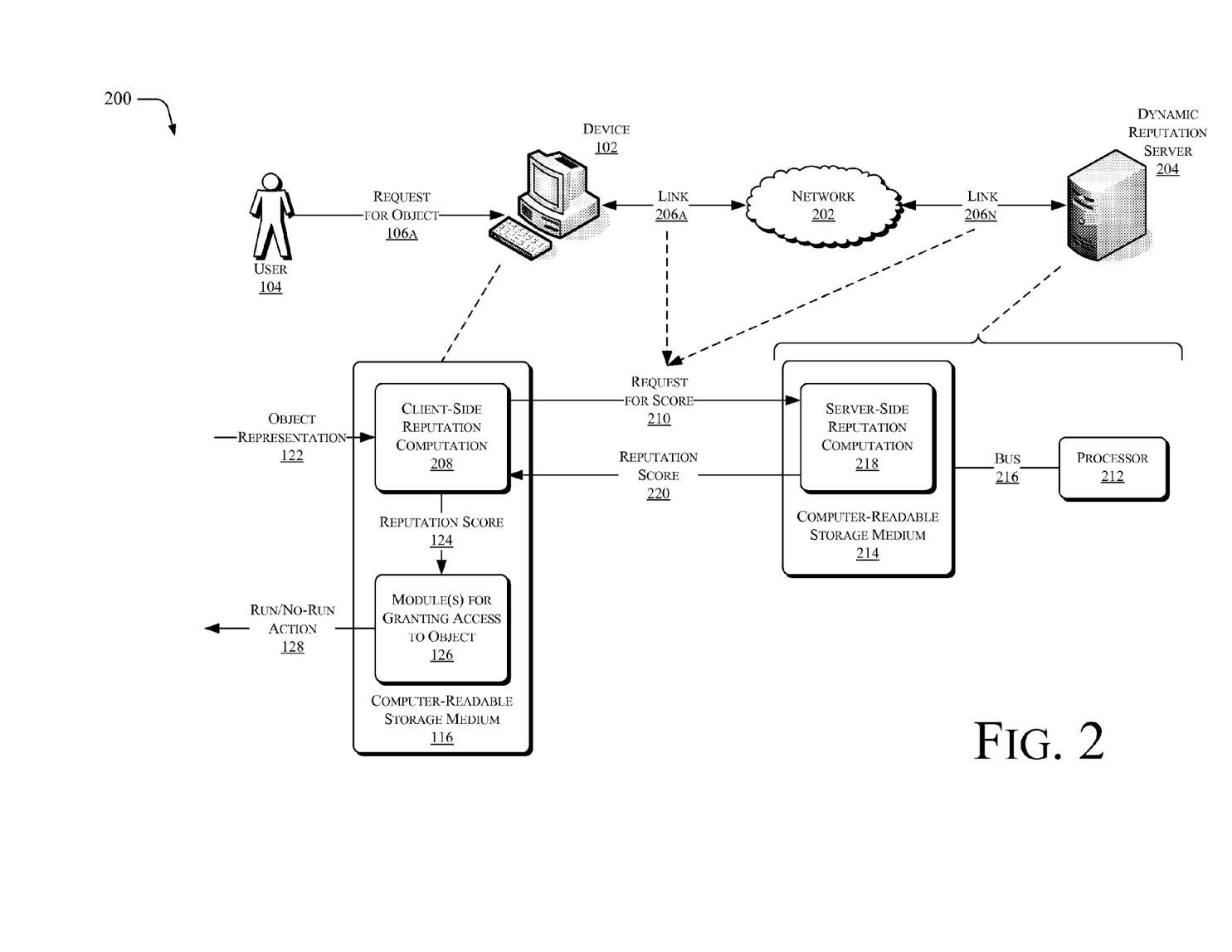
FIG. 2 is a block diagram illustrating systems and/or operating environments in which a device requests another device or service to dynamically compute the reputation scores for the objects.

FIG. 1 illustrates a scenario in which the device 102 dynamically computes reputation scores for objects itself. In these scenarios, the device 102 may be a standalone device, with one component in the device requesting that another component in the device compute the reputation score. This latter component may thus receive requests from other components on-board the same device 102. These requests may be termed as "internal". However, in other scenarios, the device 102 may request that another device or system dynamically compute these reputation scores. These scenarios may be termed as "client-server" or "external" scenarios. FIG. 2 provides examples of such scenarios, in which the device 102 may be a requesting device that cooperates with another device to compute the reputation scores.

FIG. 2 illustrates systems and/or operating environments 200 in which the device 102 requests another device or service to dynamically compute reputation scores for objects. For convenience of description, but not to limit possible implementations, FIG. 2 may carry forward some items described previously, and may denote them by similar reference signs.

The user 104 is carried forward from FIG. 1, along with the request 106a for an object, as received by the device 102. However, as shown in FIG. 2, the device 102 may communicate over one or more intermediate networks 202 with one or more servers 204 that dynamically compute the reputation scores for the objects. In these implementations, the device 102 may be viewed as a client device.

In some implementations, these servers 204 may include servers that are accessible to a plurality of devices 102. For example, the servers may offer services to the devices that include dynamically computing the reputation scores. In these implementations, the network may be a public, wide area network (e.g., the Internet).

In other implementations, the servers 204 may include servers that are accessible over a local area network (LAN) or a private network to one or more of the devices 102. In these implementations, the network 202 may include, for example, a private or corporate internet. These latter implementations may include enterprise deployments of tools and techniques for dynamically computing the reputation scores of objects. In either the public or private network scenarios, the server 204 may compute reputation scores on behalf of a plurality of client devices 102, with a plurality of different clients sharing the same server. In this manner, multiple clients may benefit from a reputation score computed at the request of one client, and the server may readily share reputation scores across multiple clients, resulting in increased system-wide performance.

FIG. 2 illustrates links 206a and 206n (collectively, links 206) over which the device 102 and the server 204 communicate over the network 202. As described further below, various requests and responses may flow over these links 206 related to the server computing the reputation scores.

Turning to the device 102, FIG. 2 carries forward the computer-readable storage medium 116. In the implementations shown in FIG. 2, the computer-readable storage medium 116 may include a client-side module 208 for requesting the server 204 to compute a reputation scores for one or more objects indicated in the representation 122. FIG. 2 denotes this request at 210.

Turning to the server 204, it may include a processor 212, which may or may not be of the same type or architecture as the processor 114. Otherwise, the above description of the processor 114 applies equally to the processor 212, which may be chosen as appropriate for the server 204.

The server 204 may also include one or more instances of computer-readable storage media 214. The storage media 214 may communicate with the processor over a bus 216, which may be of any suitable bus standard and width.

Turning to the storage media 214 in more detail, it may include one or more modules 218 for dynamically computing reputation scores for objects in response to the request 210. Thus, in the examples shown in FIG. 2, the functionality for dynamically computing reputation scores is distributed across the client device 102 and the server device 204. FIG. 2 denotes a reputation score as computed by the module 218 at 220.

At the client device 102, the client-side module 208 receives the reputation score 220. FIG. 2 carries forward the access module 126, and denotes at 124 the reputation score as input to the access module.

Figure 3:
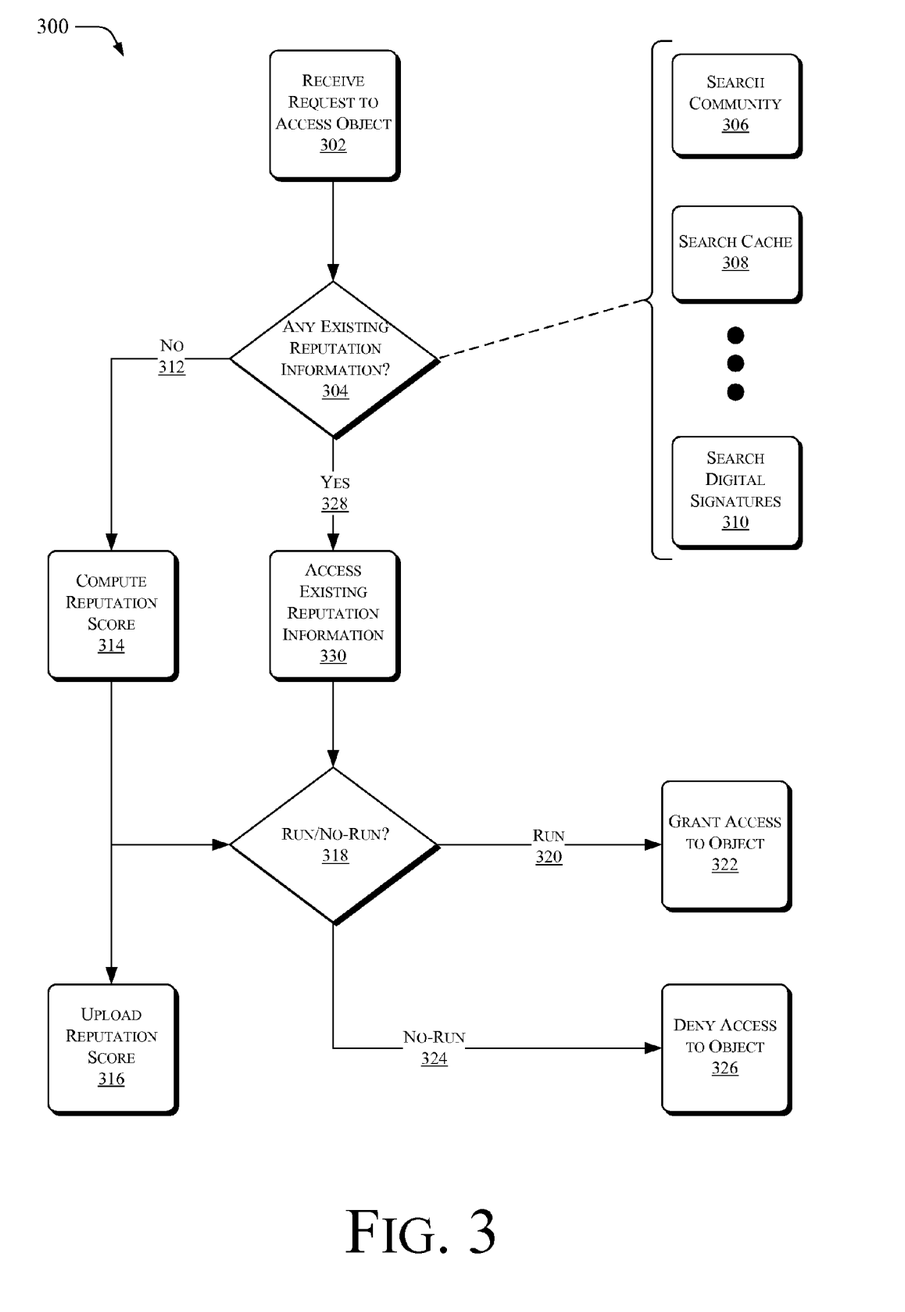
FIG. 3 is a flow diagram illustrating processes for dynamically computing the reputation scores.
Figure 4:
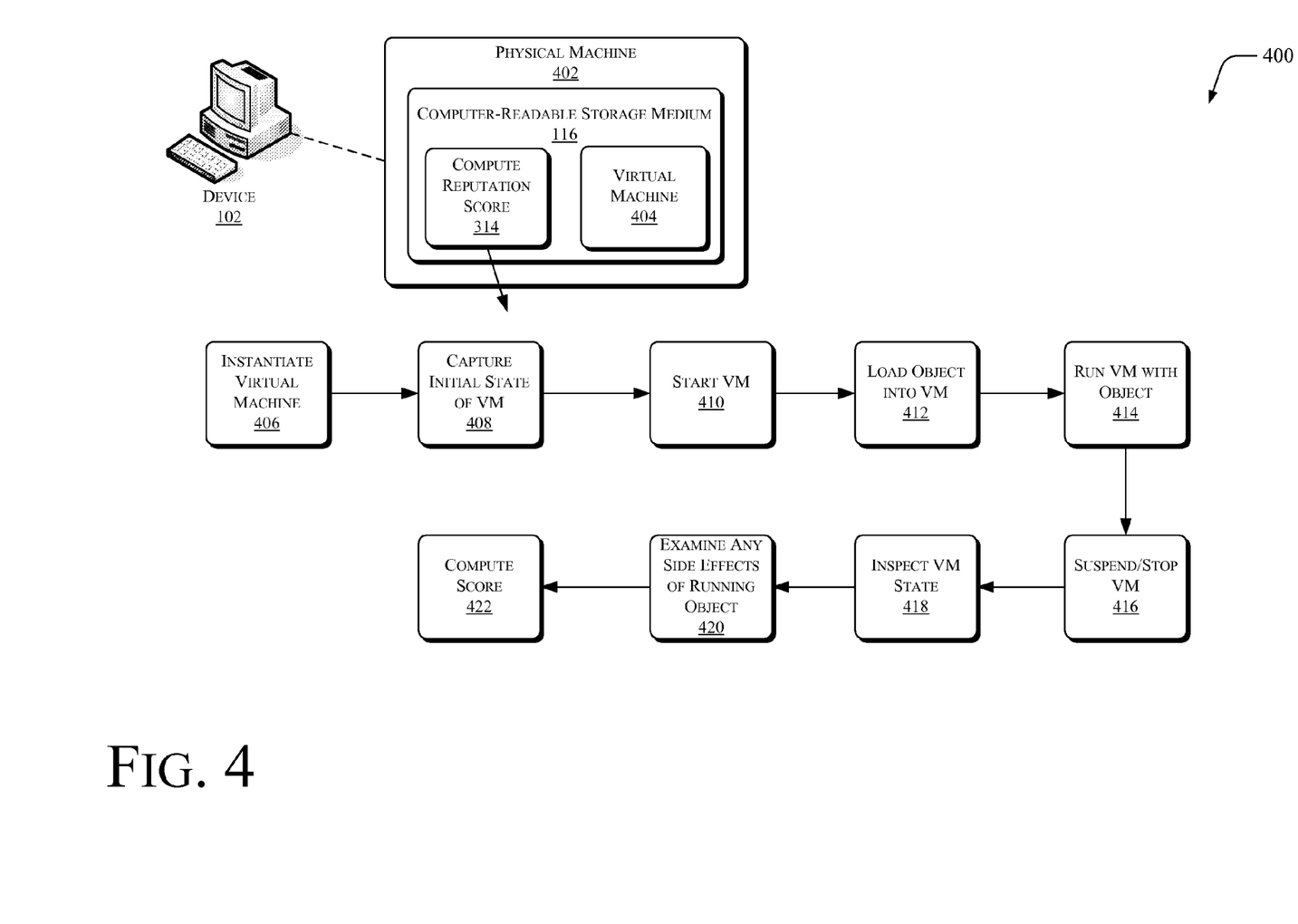
FIG. 4 is a combined block and flow diagram illustrating processes for computing the reputation scores using a virtual machine.
Figure 5:
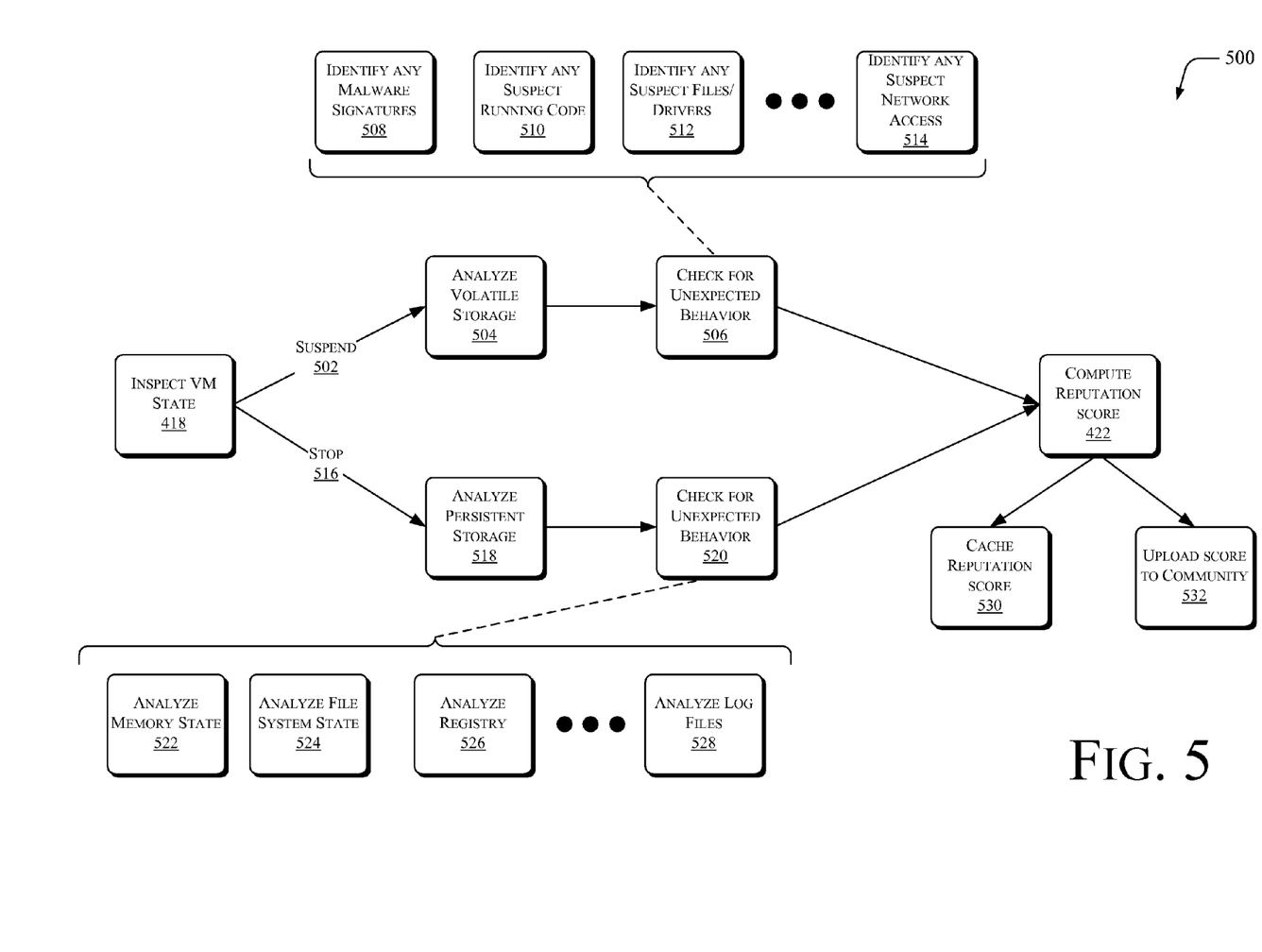
FIG. 5 is a flow diagram illustrating processes for inspecting the state of the virtual machine.

Having described the above example scenarios in FIGS. 1 and 2, the discussion now proceeds to a description of example process flows related to dynamically computing reputation scores for objects, now presented with FIGS. 3, 4, and 5.

FIG. 3 illustrates process flows 300 for dynamically computing reputation scores for objects. Portions of the process flows 300 may be performed by the device 102, the server 204, or by other systems or components, depending on particular implementations. For convenience of description, but not to limit possible implementations, FIG. 3 and the description thereof may carry forward some items described previously, and may denote them by similar reference signs.

Block 302 represents receiving a request to access at least one object of interest to a user. FIG. 1 provides examples of objects at 112, and denotes a request for the objects at 106. The examples of objects as described above apply equally to FIG. 3.

Block 304 represents determining or evaluating whether any existing reputation exists for a given object of interest. For example, if the object is a given website, block 304 may include querying a community of devices, systems, users, or the like, to ascertain whether that community can provide reasonably up-to-date reputation information about that website, as denoted at block 306. In non-limiting examples, reputation information may indicate whether accessing the website is likely to result in the device (e.g., 102) being infected with some form of malware, adware, spyware, or the like.

Block 304 may also include searching one or more cache structures for a previously-computed reputation score for the object of interest, as denoted at 308. If a reputation score for the object was computed relatively recently, then this score may still be valid and can be used again, thereby avoiding the processing and overhead involved with re-computing the reputation score.

Block 304 may also include searching for any digital signature information associated with the object of interest, as indicated at block 310. If the object has been digitally signed by a trusted entity, or bears a certificate issued by a reputable certificate authority, then the process flows 300 may determine that the object is unlikely to harm the device 102 if loaded into it.

From block 304, if the evaluation indicates that no reputation data exists for the object of interest, or that any existing reputation data is outdated, then the processes 300 may take No branch 312 to block 314, which represents computing a reputation score for the object of interest. Block 314 may include computing the reputation score dynamically and substantially in real time with the request for the object (e.g., 106), so that the user does not notice a significant delay in accessing the object (assuming that the object is not deemed high risk).

Block 316 represents uploading a computed reputation score to a storage location for later reference, whether by the device 102, the server 204, or another system or component altogether. For example, block 316 may include uploading the reputation score to a community (e.g., for later reference at block 306), caching the reputation score (e.g., for later reference at block 308), or digitally signing the object (e.g., for later reference at block 310), or the like.

The processes 300 may perform block 316 in parallel or in serial with deciding a run/no-run decision based on the reputation score, as represented in block 318. If the reputation score as compared to a threshold indicates that the object of interest imposes an acceptable level of risk if loaded into the device (e.g., 102), then block 318 may output a Run decision, as indicated at branch 320, and proceed to block 322, which represents granting access to the object. Block 322 may include allowing the user to download the object onto a user device, or allowing the user to execute or run the object on the user device.

Returning to decision block 318, if the reputation score as compared to a threshold indicates that the object of interest imposes an unacceptable level of risk, then block 318 may output a No-run decision, as indicated at branch 324, and proceed to block 326, which represents denying or blocking access to the object. Block 326 may include barring the user from downloading the object onto a user device, or not allowing the user to execute or run the object on the user device.

Returning to decision block 304, if reputation information exists for the object of interest, and the existing reputation is reasonably up-to-date, then the processes 300 may take Yes branch 328 to block 330, which represents accessing the existing reputation information. In block 330, a policy defined by a system administrator may state that if the reputation score from existing sources is less than a certain score, then the reputation should also be computed dynamically. Afterwards, the dynamic score and/or a combined score may be used to make the run/no-run decision. Afterwards, block 318 may compare the existing reputation information and/or a combined dynamic-existing reputation score to a threshold to determine whether the risk imposed by the object is acceptable, as described above.

Having described the overall process flows 300 related to dynamically computing reputation scores for objects, the discussion now proceeds to a more detailed description of computing the reputation score for a particular object using a virtual machine, now presented in FIG. 4.

FIG. 4 illustrates processes 400 for computing the reputation score for a particular object using a virtual machine. For convenience of description, but not to limit possible implementations, FIG. 4 may carry forward some items described previously, and may denote them by similar reference signs.

As shown in FIG. 4, a device or system that dynamically computes reputation scores for objects (e.g., the device 102 of FIG. 1, the server 204 of FIG. 2, or the like) may include physical machine components, denoted generally at 402. These physical machine components may include any of the items shown and described in FIG. 1. For example, the physical machine may include at least the storage medium 116. In turn, the storage medium 116 may include one or more modules containing the software instructions corresponding to block 314, which was shown in FIG. 3. The storage medium 116 may also include one or more instantiations of virtual machines, denoted generally at 404.

The virtual machine 404 may provide a protected environment in which the device or server to load and run the object of interest, to determine whether the object causes any detrimental side effects within this protected environment. In this manner, the virtual machine may isolate the physical machine from these detrimental side effects, while allowing the physical machine to identify these side effects and ascertain the risk imposed by the object of interest.

Block 406 represents instantiating the virtual machine (e.g. 404), if the virtual machine is not already instantiated. In some cases, numerous instances of the virtual machine may have been previously instantiated, thereby avoiding this delay when testing a given object. The virtual machine may derive from the type of operating system installed and running on the physical machine 402, or may be a separate operating system distinct and unrelated to the operating system running on the physical machine.

Block 408 represents capturing an initial state of the virtual machine before running or loading the object of interest. This initial state may serve as a baseline for later comparison, after the virtual machine has loaded and/or run the object for some period. In some cases, one or more virtual machines may already be running, having been pre-started to optimize on startup times.

Block 410 represents starting the virtual machine, so that block 412 may load the object into the virtual machine. Block 412 may include providing context for the object. For example, if the object is a jpeg image file, then the context may include a viewer application for jpeg image files.

Block 414 represents running the virtual machine with the loaded object, so that the physical machine may observe the behavior of the virtual machine while running the object.

Block 416 represents suspending or stopping the virtual machine at some time after block 414. The term "suspending"

may refer to temporarily halting the virtual machine with the intention to resume afterwards, while the term "stopping" may refer to halting the virtual machine after it completes execution with a given object, with no intention to resume execution afterwards. Block 416 may include performing a "dirty" stop, in which the virtual machine is stopped in a manner similar to interrupting the power supply to a physical machine. Additionally, block 416 may include performing a "clean" stop, in which the virtual machine is gracefully shutdown, with data being purged from caches for analysis, and the like.

After the virtual machine is halted, block 418 represents inspecting the state of the virtual machine, as it stands at the time that the virtual machine is halted. Block 418 may include comparing the state of the virtual machine to the initial state captured in block 408, and identifying any deviations between these states. Block 418 may include considering the context in which the object was run, when identifying these deviations. For example, if the object is a jpeg image file, the context for the object may be a viewer for .jpeg files, and block 418 may include looking for deviations from behavior normally expected of a .jpeg viewer when viewing an image file.

Block 420 represents examining the virtual machine for any side effects that result from running the object. Block 420 may include examining any deviations identified in block 418, and assessing the severity of such deviations. After block 420 examines the effects of running the object, the virtual machine may be recycled for new objects, if no harmful effects are found, or may be abandoned completely, if the harmful effects cannot be cured on the virtual machine. Generally, multiple virtual machines may be running on the host at any given time, and the host may request that one or more of the virtual machines run a given object via a suitable command structure established between the host and the virtual machines.

Block 422 represents computing a reputation score for the object based on the deviations observed in blocks 418 and/or 420. In cases in which the virtual machine is suspended more than once, block 422 may include computing the reputation score based on the states of the virtual machine at these different suspended states.

Having described the processes 400 for computing the reputation score for a particular object using a virtual machine in FIG. 4, the discussion now turns to a more detailed description of process flows for inspecting the state of the virtual machine, now presented with FIG. 5.

FIG. 5 illustrates process flows 500 for inspecting the state of the virtual machine. For convenience of description, but not to limit possible implementations, FIG. 5 may carry forward some items described previously, and may denote them by similar reference signs.

Turning in more detail to block 418 as shown in FIG. 5, if the virtual machine was "suspended", then the processes 500 may take branch 502 to block 504. The virtual machine may provide one or more one or more simulated storage areas to which the object may write. These storage areas may emulate volatile or transient storage, such as memory. Block 504 represents analyzing these simulated storage areas for any side effects resulting from running the object in the virtual machine. For example, block 504 may include analyzing operating system kernel components as they run in the simulated environment of the virtual machine. This analysis may not be possible if these components were running on the physical machine.

Block 506 represents checking for any unexpected behavior, as revealed by examining the simulated storage areas in block 504. For example, block 506 may include identifying any known malware signatures stored by the object, as denoted in block 508.

Block 506 may also include identifying any unexpected or suspect executing code, as denoted in block 510. This suspect code may be viruses, spyware, adware, or the like that the object loaded.

Block 506 may include identifying any suspect files or drivers that appeared in the virtual machine after loading the object, as denoted by block 512. These files or drivers, if unexpected, may indicate suspicious activity by the object.

Block 506 may include identifying any suspect or unexpected network activity occurring in the virtual machine after loading the object, as denoted by block 514. This network activity may include activity inbound to, or outbound from, the virtual machine. One non-limiting example of such network activity may include unexpected calls to application program interfaces (APIs), or calls to undocumented APIs. If the network activity is attributable to the object, this network activity may indicate that the object is operating under the control of other software, may be attempting to communicate with another entity, or may be engaging in other activity that may be detrimental to the physical machine, if the object were loaded into the physical machine.

Returning back to block 418 as carried forward to FIG. 5, if the virtual machine was "stopped", rather than suspended, then the process flows 500 may take branch 516 to block 518. The "stopped" state refers to allowing the virtual machine to complete execution, rather than interrupting execution as represented by the "suspended" state. In some cases, the virtual machine may be "stopped" after having been "suspended" one or more times.

Block 518 represents analyzing storage areas after the virtual machine has completed execution, while block 520 represents checking these storage areas for evidence of any unexpected behavior performed by the object when run by the virtual machine. Blocks 518 and 520 may include examining persistent storage areas for this evidence.

Turning in more detail to block 520, this block may include analyzing states of one or more memory structures as they stand after the virtual machine has run the object, as denoted at block 522. Block 520 may also include analyzing the overall state of the virtual machine's file system, as denoted at block 524. For example, the virtual machine may maintain an image of its file system, and the physical machine may mount this image and analyze it passively to identify any unexpected results of running the object. Because the physical machine has mounted the file system image to examine it passively, any anomalies within the file system image would pose no risk to the physical machine.

Block 520 may include analyzing a system registry maintained by the virtual machine, as denoted at block 526. If the system registry contains any anomalous entries after the virtual machine runs the object, this may indicate that the object would impose an unacceptable level of risk to the physical machine.

Block 520 may include analyzing any log files generated by the virtual machine when running the object, as denoted at block 528. For example, the virtual machine may be instrumented to generate one or more log files as it loads and runs the object. For example, the virtual machine may generate network log files, memory log files, or the like. Entries in these log files may provide evidence of nefarious activity performed by the object.

Turning to block 422 as carried forward to FIG. 5, this block represents computing reputation scores based on the behavior indicated by blocks 506 and/or 520. Block 422 may include computing the reputation scores any number of different ways, for example by assigning different weights or importance to different types of activities revealed in blocks 506 and/or 520.

Block 422 may include analyzing code content and data content associated with the object of interest. Code content analysis may include detecting any side-effects resulting from executing code associated with the object, while data content analysis may include detecting any side-effects resulting from viewing data associated with the object.

In some cases, a combination of different anomalous behaviors may lead to a reputation score indicating that the object imposes high risk. In other cases, one instance of particularly egregious anomalous behavior may lead to a reputation score indicating that the object imposes high risk.

Block 530 represents caching the reputation score computed for a given object for later reference, and block 532 represents uploading the reputation score for reference by members of a community. In either case, the reputation scores may be time-stamped or otherwise marked or indexed to indicate when the reputation scores were computed. Such time-stamps may enable other processes to afterwards determine how recently the reputation scores were computed.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. At least one machine-readable memory comprising machine-readable instructions that, when executed by at least one processor, cause the at least one processor to perform acts comprising:
    receiving, at a current time, at least one request for at least one object, wherein the object comprises at least one of a file stored on a server or a webpage hosted on a website;
    determining whether a reputation score for the at least one object exists, and if so, determining whether the reputation score is valid based at least in part on a difference between the current time and a previous time when the reputation score was known to be valid; and
    in response to determining that the reputation score does not exist or is not valid, computing the reputation score for the at least one object by:
        instantiating a protected virtual environment in which to execute the object,
        executing the object within the protected virtual environment,
        suspending execution of the object within the protected virtual environment, and
        analyzing at least one aspect of the protected virtual environment to determine the reputation score while the execution of the object is suspended, the reputation score is computed substantially in real time with the at least one request for the file stored on the server or the webpage hosted on the website, the reputation score indicating whether the file stored on the server or the webpage hosted on the website, when loaded into and executed within the protected virtual environment, is associated with an acceptable level of risk.

2. The machine-readable memory of claim 1, wherein the instructions cause the processor to perform the acts further comprising providing the reputation score to a requesting device.

3. The machine-readable memory of claim 1, wherein the instructions cause the processor to perform the acts further comprising:
    generating a request for the reputation score for the at least one object.

4. The machine-readable memory of claim 1, wherein the instructions cause the processor to perform the acts further comprising determining whether to grant access to the object based on the reputation score of the object.

5. The machine-readable memory of claim 1, wherein the instructions cause the processor to perform the acts further comprising caching the reputation score.

6. The machine-readable memory of claim 1, wherein the instructions cause the processor to perform the acts further comprising searching a cache for the reputation score for the object.

7. The machine-readable memory of claim 1, wherein the instructions cause the processor to perform the acts further comprising capturing an initial state of the protected virtual environment, before the object is executed in the protected virtual environment.

8. The machine-readable memory of claim 1, wherein the instructions cause the processor to perform the acts further comprising inspecting at least one state of the protected virtual environment while the object is executing within the protected virtual environment.

9. The machine-readable memory of claim 1, wherein the instructions cause the processor to perform the acts further comprising checking for any unexpected behavior of the object when executing within the protected virtual environment.

10. The machine-readable memory of claim 9, wherein the instructions for checking for any unexpected behavior include instructions for analyzing at least one persistent storage location associated with the protected virtual environment.

11. The machine-readable memory of claim 9, wherein the instructions for checking for any unexpected behavior include instructions for analyzing at least one volatile storage location associated with the protected virtual environment.

12. The machine-readable memory of claim 9, wherein the instructions for checking for any unexpected behavior include instructions for searching the protected virtual environment for at least one malware signature resulting from executing the object.

13. The machine-readable memory of claim 9, wherein the instructions for checking for any unexpected behavior include instructions for searching the protected virtual environment for at least one network access resulting from executing the object.

14. The machine-readable memory of claim 9, wherein the instructions for checking for any unexpected behavior include instructions for searching the protected virtual environment for at least one installed file resulting from executing the object.

15. A system comprising:
a server coupled to communicate with at least one client device and having one or more processors, memory, and a server-side reputation computation module stored on the memory and executable by the one or more processors to:
receive, at a current time, a request for an object from the at least one client device, wherein the object comprises a webpage hosted on a website,
determine whether a reputation score for the object exists, and if so, determine whether the reputation score is valid based at least in part on a difference between the current time and a previous time when the reputation score was known to be valid, and
in response to determining that the reputation score does not exist or is not valid:
instantiate, prior to computing a reputation score for the object, a protected virtual environment in which to execute the object,
execute the object within the protected virtual environment,
suspend execution of the object within the protected virtual environment,
analyze at least one aspect of the protected virtual environment while the execution of the object is suspended, and
dynamically compute the reputation score for the object based at least in part on the analysis of the at least one aspect of the protected virtual environment, in which the reputation score is computed substantially in real time with the request for the webpage hosted on the website, the reputation score indicating whether the webpage hosted on the website, when loaded into the protected virtual environment, operates with a level of risk below a threshold.

16. The system of claim 15, wherein the client device includes a module for determining whether to grant access to the object based on the reputation score.

17. A method comprising:
receiving, at a first physical computing device and at a current time, at least one request, from a second physical computing device, for at least one object, wherein the object comprises a file stored on a server;
determining whether a reputation score for the at least one object exists, and if so, determining whether the reputation score is valid based at least in part on a difference between the current time and a previous time when the reputation score was known to be valid; and
in response to determining that the reputation score does not exist or is not valid, determining the reputation score for the at least one object by:
instantiating, at the first physical computing device, a protected virtual environment in which to execute the object,
executing the object within the protected virtual environment of the first physical computing device,
suspending the execution of the object within the protected virtual environment,
analyzing, at the first physical computing device, at least one aspect of the protected virtual environment while execution of the object is suspended, and
computing by the first physical computing device the reputation score for the at least one object based at least in part on the analysis of the at least one aspect of the protected virtual environment, in which the reputation score is computed substantially in real time with the at least one request for the file stored on the server, the reputation score indicating whether the file stored on the server, when executed within the protected virtual environment by using a processor, operates with an acceptable risk level.

18. The method of claim 17, further comprising providing the reputation score to the second physical computing device.

19. The method of claim 17, further comprising:
checking for a behavior of the object within the protected virtual environment.

20. The method of claim 17, wherein the determining whether the reputation score is valid includes:
determining that the reputation score is valid based at least in part on the object having digital signature information associated therewith in which the digital signature information is digitally signed by a trusted entity.

* * * * *